Figure 1:
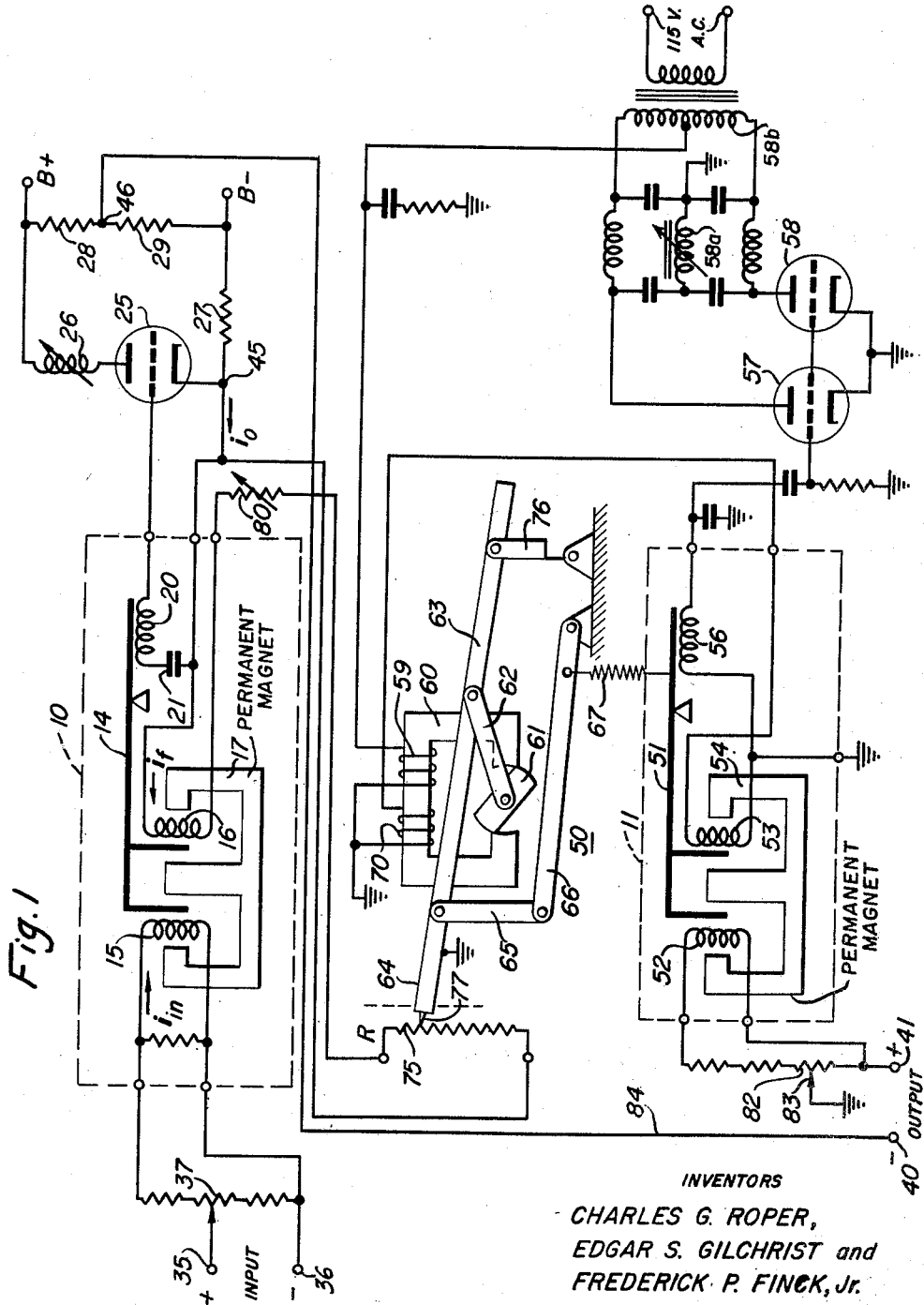

INVENTORS
CHARLES G. ROPER,
EDGAR S. GILCHRIST and
FREDERICK P. FINCK, Jr.
BY
Mason, Kolehmainen, Rathburn and Wyss.
ATTORNEYS

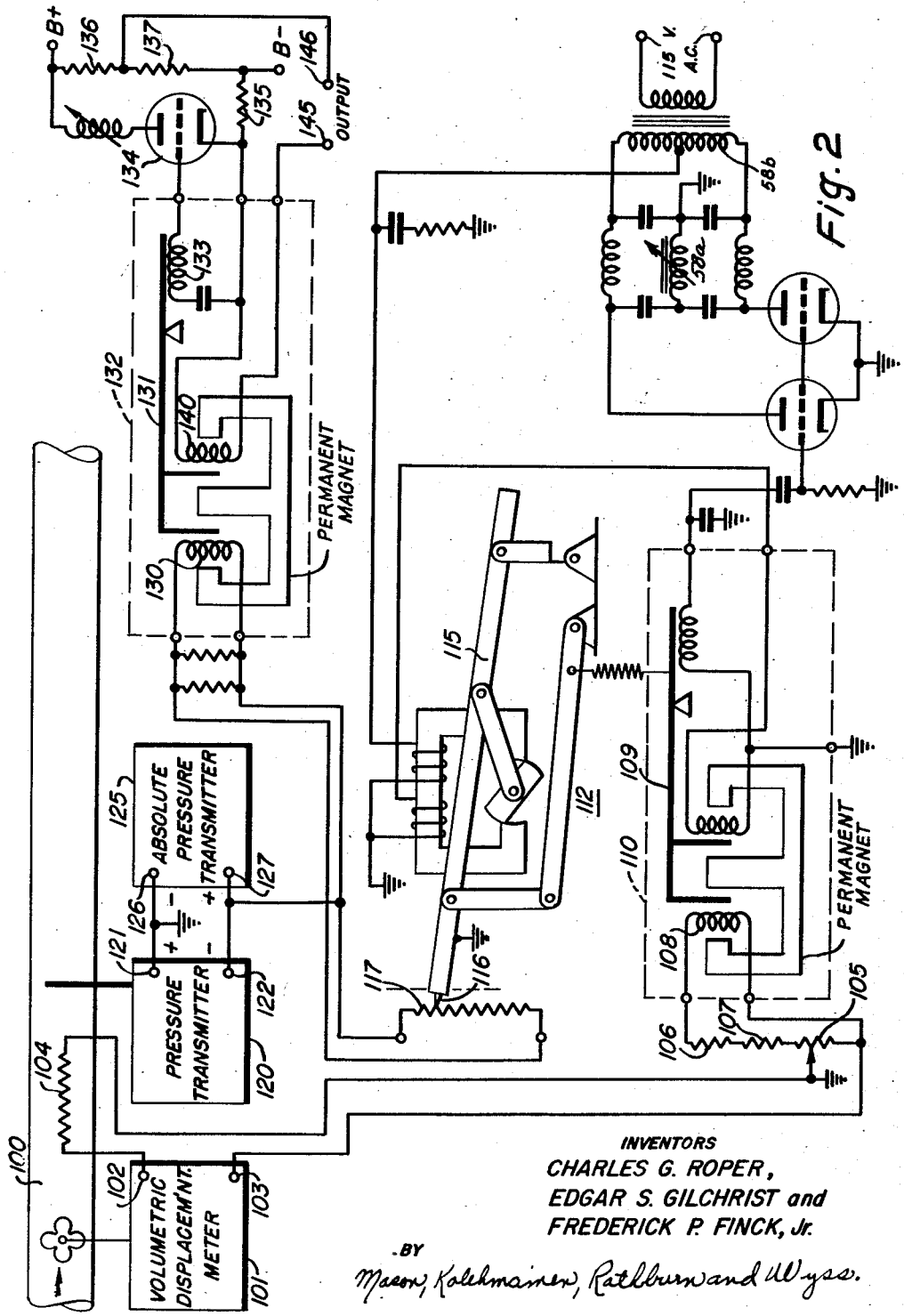

United States Patent Office 2,957,627
Patented Oct. 25, 1960

2,957,627
COMPUTER EMPLOYING ELECTROMECHANICAL BALANCE

Charles Garland Roper, Fairfield, Edgar S. Gilchrist, Easton, and Frederick Phillip Finck, Jr., Fairfield, Conn., assignors, by mesne assignments, to Robertshaw-Fulton Controls Company, Richmond, Va., a corporation of Delaware Filed June 1, 1956, Ser. No. 588,806

3 Claims. (Cl. 235—194)

The present invention relates to computers, and, more particularly, to computers of the type employed to produce an electrical output signal which is related to one or more electrical input signals in accordance with a predetermined mathematical function. While the invention is of general utility, it is particularly suitable for use in and will be described in connection with an electronic process control system of the type described in a copending application of Charles G. Roper and Edgar S. Gilchrist, Serial No. 389,564, filed on November 2, 1953, and assigned to the same assignee as the present invention.

In the system disclosed in the above identified copending application a direct current signal is developed in accordance with the measured variable which is transmitted from the process area to the control area at which point certain signal components necessary to produce proportional, rate and reset action may be introduced. However, in certain instances it is desirable to modify the direct current input signal in accordance with some predetermined mathematical function. For example, it may be desirable to develop an output signal which is proportional to the product of two or more direct current input signals. On the other hand, it may, in some instances, be desirable to develop an output signal which is proportional to the square root of the input signal. However, such computing arrangements should be compatible with the overall process control system and be arranged to provide a standardized output signal which can be used to energize other component units of the system.

It is, therefore, an object of the present invention to provide a new and improved computer circuit wherein electromechanical balance units are employed to provide precise and accurate control of an output signal in accordance with a predetermined mathematical function.

It is another object of the present invention to provide a new and improved electronic computing arrangement wherein electromechanical balance units employing pivotally mounted beams are employed to develop an output signal which is proportional to the product of two standardized direct current input signals.

A further object of the present invention is to provide a new and improved computing arrangement wherein electromechanical balance units employing pivotally mounted beams are employed to develop a direct current output signal which is proportional to the square root of a direct current input signal.

The invention, both as to its organization and method of operation, together with further objects and advantages thereof, will best be understood by reference to the following specification taken in connection with the accompanying drawings, in which:

Fig. 1 is a schematic diagram of a computing arrangement embodying the principles of the present invention wherein an electrical output signal is developed which is proportional to the square root of an electrical input signal; and Fig. 2 is a schematic design of an alternative embodiment of the invention wherein an electrical output signal is developed which is proportional to the product of two input signals.

Referring now to the drawings and, more particularly, to Fig. 1 thereof, the computing arrangement therein illustrated comprises a first electromechanical balance unit indicated generally at 10 and a second electromechanical balance unit indicated generally at 11. The balance unit 10 includes a pivotally mounted beam 14 which carries at one end thereof an input coil 15 and a feedback coil 16, the coils 15 and 16 being positioned within a suitable magnetic field developed by means of a permanent magnet 17. Adjacent the other end of the beam 14 there is provided an oscillator coil 20 which is connected in series with the condenser 21 to the input circuit of an oscillator tube 25. The oscillator tube 25 and its associated anode load inductance 26 forms one arm of a bridge circuit, the resistors 27, 28 and 29 forming the other three arms of the bridge. The terminals B+ and B— of this bridge circuit are energized by any suitable unidirectional voltage source which is preferably isolated from ground.

A direct current input signal is impressed upon the input terminals 35 and 36 and by means of the potentiometer 37 a variable portion of this input signal may be impressed upon the input coil 15 so as to cause a corresponding deflection of the beam 14. The direct current input signal impressed upon the terminals 35 and 36 may be derived from any suitable preceding component of the control system wherein a direct current signal is produced, preferably in the standard range of .5 to 5.0 milliamperes, which varies in accordance with variations of the measured variable. For example, the direct current input signal may be developed from a differential pressure transmitter, of the type described in detail in the above identified copending application, which develops a .5 to 5.0 milliampere direct current signal which is proportional to the square of the actual flow. The computing arrangement shown in Fig. 1 is then employed to develop at the output terminals 40 and 41 thereof, a direct current output signal which is directly proportional to flow, that is a direct current output signal which is proportional to the square root of the direct current input signal impressed upon the terminals 35 and 36.

If the feedback coil 16 is connected directly across the equalizing terminals 45 and 46 of the above described bridge circuit, the beam 14 is deflected in direct proportion to the input signal impressed upon the input terminals 35 and 36. However, the computing apparatus of Fig. 1 includes a recorder section indicated generally at 50 which, in addition to producing a record of the desired square root signal, functions to provide the desired square root function. More particularly, the recording section 50 includes a second electromechanical balance unit 11 which is provided with a pivotally mounted beam 51 which carries an input coil 52 and a feedback coil 53, the coils 52 and 53 being positioned within a magnetic field developed by the permanent magnet 54. Adjacent the other end of the beam 51 there is provided a control inductance 56 which is connected to the control grids of a pair of control tubes 57 and 58, these tubes being energized so as to produce an output signal across the winding 59 of a rotary solenoid 60. More particularly, the plate and grid circuits of the tubes 57 and 58 are interconnected to provide a full wave rectifier, and a push-pull oscillator, of which the variable inductance 58(a) comprises the tuning element. The center tap of the secondary winding 58(b) is connected to the winding 59 of the rotary solenoid 60. The rotor 61 of the rotary solenoid 60 is connected by means of the linkage elements 62 and 63 with a recording head 64 so as to produce a record of the square root output signal on a suitable chart (not shown) adjacent thereto. The linkage elements 65 and 66 are employed in conjunction with a calibrated spring 67 to apply a feedback force to the beam 51 in opposition to the force produced thereon by virtue of current flow through the input coil 52. In addition, the feedback coil 53 may be energized from a control winding 70 on the rotary solenoid 60. The elements described thus far in connection with the recorder section 50 may be substantially identical to corresponding elements described in detail in the above identified copending application and hence a detailed description of these elements herein is considered unnecessary. However, in accordance with the present invention a resistance card or slide wire 75 is positioned adjacent the chart of the recorder and a contact 77 on the recorder element 63 is employed as a movable potentiometer arm which makes electrical contact with the resistance card 75 as the element 63 is moved, the contact 77 being grounded through the element 63 and the supporting mounting element 76.

In order to provide an output signal which is proportional to the square root of the direct current input signal, the equalizing terminals 45 and 46 of the above described bridge circuit are connected in circuit with the input coil 52 of the electromechanical balance unit 11 and also in circuit with the resistance card 75. Thus, the equalizing terminal 45 is connected through the feedback coil 16, a variable resistance 80, the lower portion of the resistance card 75 to the grounded contact 77, through the ground connection to the arm 83 of an input potentiometer 82 associated with the input coil 52 of the electromechanical balance unit 11, through a work circuit connected across the output terminals 40 and 41 and over the conductor 84 to the equalizing terminal 46. A portion of the output current thus flows through the input coil 52 of the recording section 50. However, the resistance card 75, which is varied in accordance with the position of the beam 51, is also connected in the output current circuit. The current flowing through the feedback coil 16 on the beam 14 must exactly balance the current flowing through the input coil 15 in response to the direct current input signal. Considering the total equalizing terminal current as $i_0$, the current flowing through the feedback coil as $i_f$ and the current flowing in the input coil 15 as the current $i_{in}$, we may write the following equation:

$$i_{in} = K_1 i_f \quad (1)$$

However, the feedback coil current is also determined by the resistance card 75, which may be termed R, so that, $$i_f = K_2 i_0 R \quad (2)$$

Substituting for $i_f$ in Equation 1 we have, $$i_{in} = K_1 K_2 i_0 R \quad (3)$$

Since the resistance card R is controlled in accordance with the current $i_0$ which flows through the input coil 52 we have, $$i_{in} = K i_0^2 \quad (4)$$

or $$i_0 = K' \sqrt{i_{in}} \quad (5)$$

From the above mathematical derivation it will be evident that the output current flowing through a work circuit connected to the output terminals 40 and 41 is a function of the square root of the input current flowing through the input coil 15 of the electromechanical balance unit 10. The output current supplied to the output terminals 40 and 41 may then be transmitted to any desired location and may be supplied to any suitable integrating device in the event that an indication or record of total flow is desired.

In the alternative arrangement of Fig. 2 there is disclosed an arrangement for obtaining a direct current output signal which is proportional to the product of two standardized direct current input signals. Specifically, in the arrangement of Fig. 2 there is disclosed an arrangement for measuring volume flow with compensation for temperature and pressure at standard conditions.

Thus, referring to this figure, the volume flow through the pipe 100 is measured by a suitable volumetric displacement meter 101, the meter 101 preferably being of vane type employing a tachometer which develops a direct current signal at the output terminals 102 and 103 thereof proportional to the volume flow through the pipe 100. A resistance bulb 104, positioned within the pipe 100, is connected in series with the output terminals 102 and 103 of the meter 101, this series combination being connected through an input potentiometer 105 and the series resistors 106 and 107 to an input coil 108 positioned on the pivotally mounted beam 109 of a first electromechanical balance unit 110. The balance unit 110 is associated with a recorder section generally indicated at 112, which is substantially identical to the recorder section 50 shown and described in detail above in connection with Fig. 1. Since the direct current signal developed by the meter 101 is proportional to volume flow and the bulb resistance 104 is approximately proportional to temperature, the input current flowing through the coil 108 is approximately proportional to the ratio of volume flow to temperature. Accordingly, the recorder element 115 of the recorder section 112 is moved proportionally and the contact 116 of the resistance card 117 mounted adjacent the end of the recorder element 115 is also moved in proportion to the input current flowing through the coil 108, it being understood that the feedback elements described above in connection with the recorder section 50 in Fig. 1 function in the manner described in the above identified copending application to rebalance the beam 109 and provide such proportional action.

In order to introduce a component proportional to pressure, there is provided a pressure transmitter 120 associated with the pipe 100 which may be substantially identical to the pressure transmitter described in the above identified copending application, this pressure transmitter developing a .5 to 5.0 milliampere direct current output signal at the output terminals 121 and 122 thereof. Reference to standard pressure conditions is provided by means of an absolute pressure transmitter 125, which may be substantially identical to the pressure transmitter 120 except that the Bourdon tube thereof is evacuated, and the output terminals 126 and 127 of the absolute pressure transmitter 125 are connected in series with the output terminals 121 and 122 to provide the desired compensation. The combined outputs of the transmitters 120 and 125 are coupled through a variable portion of the resistance card 117 to an input coil 130 which is carried on a pivotally mounted beam 131 of a second electromechanical balance unit 132. An oscillator coil 33 is positioned adjacent one end of the beam 131 so that variations in the deflection thereof produce a corresponding variation in the current of the oscillator tube 134, the tube 134 forming one arm of a bridge circuit the other three arms of which comprise the resistors 135, 136 and 137. A feedback coil 140 which is also positioned on the beam 131 is connected in series with the output terminals 145 and 146 of the computing arrangement of Fig. 2 across the equalizing terminals of the above described bridge.

The current flowing through the feedback coil 140, and hence the output current flowing in a work circuit connected to the output terminals 145 and 146, must exactly balance the input current flowing through the coil 130. However, this input current is proportional both to the direct current signal produced by the combined pressure transmitters 120 and 125 and the position of the contacts 116 on the resistance card 117. This will be readily apparent when it is realized that the terminals 121, 126 of the transmitters 120 and 125 are connected to ground as is the movable arm 116 associated with the resistance card 117. Accordingly, an input current is supplied to the coil 130 which is dependent upon the combined output of the transmitters 120 and 125 and varies in accordance with the position of the contact 116 on the resistance card 117. Since the position of the contact 116 is in turn proportional to the current flowing through the input coil 108 of the electromechanical balance unit 110 the output current flowing through a work circuit connected to the output terminals 145 and 146 is proportional to the product of the two above described input currents and hence is a measurement of volume flow referred to standard conditions. Since the displacement meter 101 does not produce any output current at zero flow both of the units 101 and 125 are calibrated for 4.5 milliampere full scale and the electromechanical balance unit 132 is adjusted in conjunction with the pressure transmitter 120 to provide a .5 milliampere output signal at the minimum scale position so that a standard .5 to 5.0 milliampere direct current signal is produced at the output terminals 145 and 146. In this connection it will be understood that while the computing arrangement of Fig. 2 has been found satisfactory in providing measurement of volume flow with pressure and temperature compensation, any two direct current input signals, derived from suitable measuring elements, may be multiplied in the arrangement shown in Fig. 2 to provide an output current proportional to the product of these input signals.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a computer, the combination of a first electromechanical balance unit having a pivotally mounted beam carrying an input coil which is positioned within a magnetic field, means for impressing a first direct current input signal on said input coil, thereby to deflect said beam in accordance with said first input signal, electronic means for developing an output signal proportional to deflection of said beam, an output element, means responsive to said output signal for rebalancing said beam and moving said output element, a resistance device, means responsive to movement of said output element for varying said resistance device, a second electromechanical balance unit, means for impressing a second input signal on the input of said second electromechanical balance unit, means connecting said resistance device to the input of said second electromechanical balance unit, and means responsive to movement of the beam of said second electromechanical balance unit for developing an output signal proportional to the product of said first and second input signals.

2. In a computer, the combination of a first electromechanical balance unit having a pivotally mounted beam carrying an input coil which is positioned within a magnetic field, means for impressing a first direct current input signal on said input coil, thereby to deflect said beam in accordance with said first input signal, electronic means for developing an output signal proportional to deflection of said beam, an output element, means responsive to said output signal for rebalancing said beam and moving said output element, a resistance device, means responsive to movement of said output element for varying said resistance device, a second electromechanical balance unit having a pivotally mounted beam carrying an input coil which is positioned within a magnetic field, means connecting said resistance device across the input coil of said second electromechanical balance, means for impressing a second direct current input signal across a portion of said resistance device, and means including an oscillator responsive to movement of the beam of said second electromechanical balance unit for developing a direct current output signal proportional to the product of said first and second input signals.

3. In a computer, the combination of a first electromechanical balance unit having a pivotally mounted beam carrying an input coil which is positioned within a magnetic field, means for impressing a first direct current input signal on said input coil, thereby to deflect said beam in accordance with said first input signal, electronic means for developing an output signal proportional to deflection of said beam, an output element, means responsive to said output signal for rebalancing said beam and moving said output element, a resistance device, means responsive to movement of said output element for varying said resistance device, a second electromechanical balance unit having a pivotally mounted beam carrying an input coil which is positioned within a magnetic field, means for impressing a second direct current input signal on said input coil of said second electromechanical balance unit, means connecting said resistance device in circuit with said input coil of said second electromechanical balance unit, and means responsive to movement of the beam of said second electromechanical balance unit for developing a direct current output signal having a predetermined mathematical relationship to said first and second input signals.

References Cited in the file of this patent
UNITED STATES PATENTS

| | | |
|---|---|---|
| 2,082,539 | Fischer | June 1, 1937 |
| 2,686,635 | Markson | Aug. 17, 1954 |